Aug. 22, 1933.　　　F. HENNEBÖHLE　　　1,923,621
CUSHIONED RELIEF AND CHECK VALVE
Filed Dec. 16, 1931
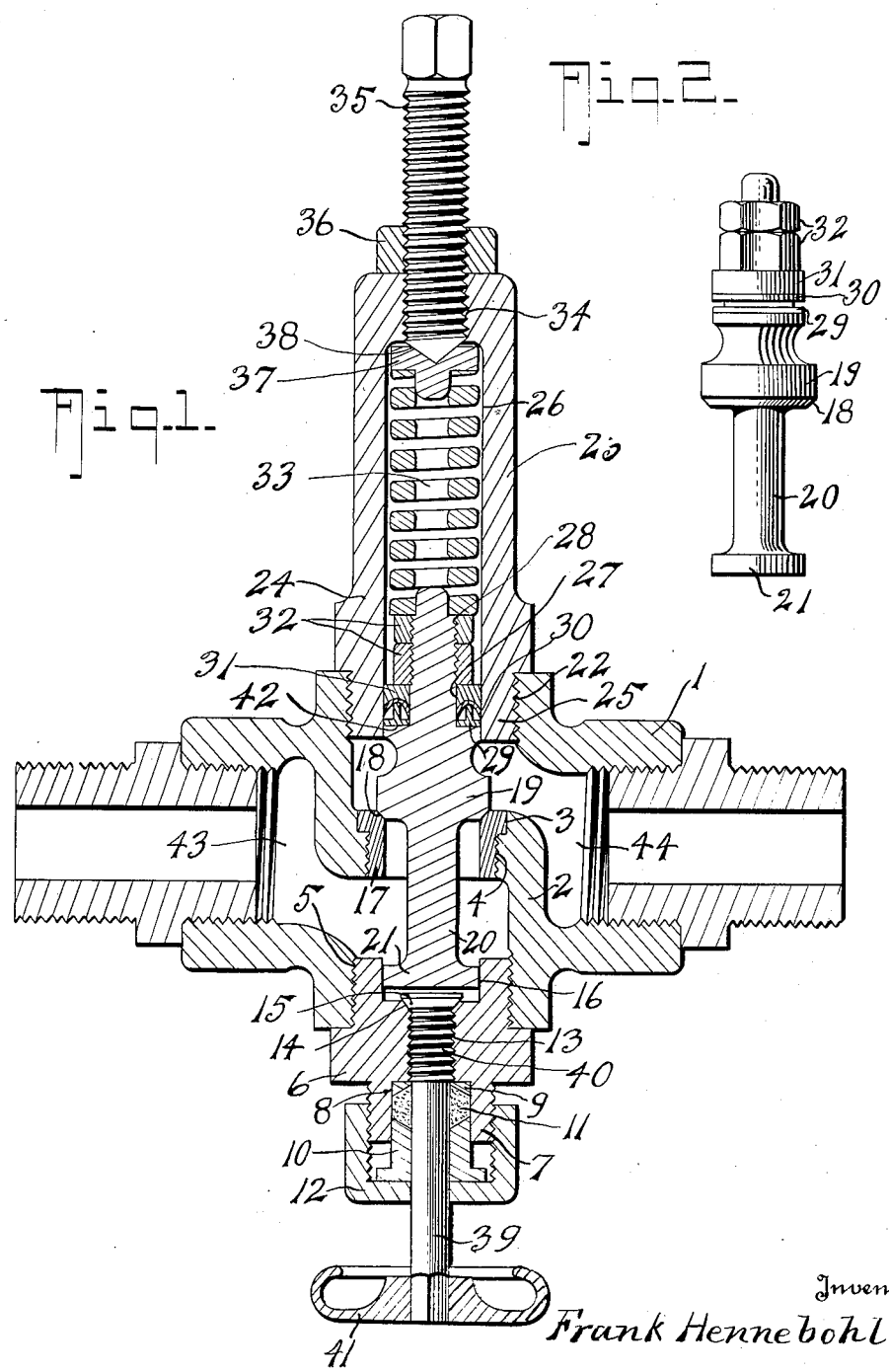
Inventor
Frank Hennebohle
By Albert E. Dieterich
Attorney Patented Aug. 22, 1933

1,923,621

UNITED STATES PATENT OFFICE 1,923,621

CUSHIONED RELIEF AND CHECK VALVE

Frank Henneböhle, Chicago, Ill.

Application December 16, 1931
Serial No. 581,476

2 Claims. (Cl. 251—142)

My invention is an improved hydrostatic piston type valve and it particularly has for its objects to provide a valve of this type which will work successfully with high pressures, one which is spring loaded and adjustable between pressures of say three hundred and one thousand pounds or more per square inch, a valve which will act as a check valve in one direction and a relief valve in the other direction, and one whose moving surfaces are hard enough to prevent undue erosion from high velocity of liquid.

Further, it is an object to provide a valve of the type stated which is capable of manual lifting with reasonable effort so as to provide fine control of discharge when the valve proper is lifted.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a central, vertical, longitudinal section of the valve.

Figure 2 is a side elevation of the valve piston.

In the drawing, in which like numerals of reference indicate like parts in all figures, 1 represents the casing which has a partition 2 provided with a threaded passage 4 having a counter-sunk portion 3.

The casing 1 also has aligned threaded openings 5 and 22 respectively, the axes of which in the present embodiment of my invention illustrated coincide with that of the valve passage, 4. 6 is a plug screwed into the threaded opening 5 and having an externally threaded neck 7 provided with a packing chamber 8 to receive the metallic gland washer 9, the compressible packing 11 and the metallic gland cap 10. The cap 10 is held in place with pressure by means of a packing nut 12 which is screwed onto the neck 7.

The plug 6 has a threaded passage 13 which is enlarged at 16 to form a guide-way for the guide disc 21 of the piston valve, there being a beveled seat 14 provided at the inner end of the threaded portion 13 of the passage.

A manually operated valve lifter 39 is provided which has a threaded portion 40 to fit the threaded portion 13 and which has a head with a beveled face 15 to cooperate with the beveled seat 14 as a valve to hold the fluid pressure within the inlet side of the valve and prevent its escape through the plug 6.

17 is a valve seat bushing formed of hard metal which will resist erosion, while 19 designates the piston valve also formed of hard erosion resisting metal suitable for the purpose. The piston valve 19 includes a shank 20 and the guide disc 21 on the end of the shank. It also includes a cylindrical part 42, and a cylindrical neck 27 having a threaded portion 28 to receive jam nuts 32, there being a piston packing provided consisting of a T-shaped holder 29, flexible packing disc 30 and metallic packing seating disc 31, the parts 29, 30 and 31 being held in place by the nuts 32.

The threaded passage 22 is closed by the threaded end 25 of the relief spring cylinder 23, the latter having a nut portion 24 by means of which it may be screwed and unscrewed.

The cylinder 23 has a straight bore 26 in which the portion 42 of the piston valve and the parts above it are located.

A suitable relief spring 33 is located in the cylinder 23, which cylinder is also provided with a threaded aperture to receive the relief spring tension screw 35 that is held against movement when once adjusted by means of a jam nut 36. The screw has its inner end seated in the recess or seat 38 in the spring cap 37.

A hand wheel or knob 41 is provided on the stem 39 of the valve lifter by means of which it may be turned to unseat the piston valve 19 when desired. 43 is the inlet of the valve casing and 44 is the outlet which in the illustrated embodiment of my invention are internally threaded. If the valve is to be connected to pipes having female threads suitable nipples with male threads may be attached to the valve casing 1 as indicated.

It will be seen from the foregoing description that by virtue of the fact that the member 15 seats on the seat 14 when the valve lifting device is screwed down a fluid tight joint is provided to prevent escape of liquid from the inlet side of the valve by leakage past the guide disc 21 and thus relieves the gland around the stem 39 of the valve lifter. It will also be seen that when the piston valve 19 is seated a rise of pressure on the inlet side sufficient to overcome the back pressure at the outlet side of the valve plus the pressure of the springs 33 will cause the valve 19 to unseat and relieve the pressure at the inlet side of the valve. It is to be noted that the piston 21 has no packing; therefore fluid will pass around that piston sufficiently to apply a pressure beneath it as well as above it. The purpose of the piston 21 is to act simply as a dash-pot and guide.

The pressure at which the valve 19 shall open is adjusted to the desired degree by means of screw 35 as will be well understood by those skilled in the art. If it be desired to open the valved passage the piston valve 19 can be raised with very little effort by means of the screw actuated valve lifter 39, the treaded portion 40 of which has threads cut at such a pitch as will render the operation as easy as possible.

From the foregoing description, taken in connection with the accompanying drawing, it is thought the complete construction, operation and advantages of my invention will be clear to those skilled in the art to which it relates.

What I claim is:

1. A cushioned relief and check valve, comprising a casing having an inlet and an outlet for fluid and having a partition between the same, the partition itself having a threaded passage, a hardened metal valve seat bushing threaded into the threaded passage and having a valve seat, said casing having a threaded opening at each side of the said partition, the axes of which openings coincide with that of said bushing, one of the said threaded openings being at the inlet side of the valve and the other being at the outlet side of the same, a plug in said threaded opening at the inlet side having a valve guide-way, a threaded passage at its inner end having a valve seat and having a packed gland at its outer end, a valve lifter comprising a stem having a threaded portion to fit said last named threaded passage and having a smooth portion extending through said gland and having a valve head to engage said last named valve seat, a knob on said extended portion of said stem, a hardened metal piston valve having a head portion with a face to engage the seat of said bushing and having a stem projecting through said bushing and terminating in a guide disc which lies in said valve guide-way, and a relief spring device secured in the aforesaid threaded opening at the outlet side of said valve casing and cooperating with said piston valve for the purposes described.

2. A cushioned relief and check valve, comprising a casing having an inlet and an outlet for fluid and having a partition between the same, the partition itself having a threaded passage, a hardened metal valve seat bushing threaded into the threaded passage and having a valve seat, said casing having a threaded opening at each side of the said partition the axes of which openings coincide with that of said bushing, one of the said threaded openings being at the inlet side of the valve and the other being at the outlet side of the same, a plug in said threaded opening at the inlet side having a valve guide-way, a threaded passage at its inner end and a packed gland at its outer end, a valve lifter comprising a stem having a threaded portion to fit said last named threaded passage and having a smooth portion extending through said gland, a knob on said extended portion of said stem, a hardened metal piston valve having a head portion with a face to engage the seat of said bushing and having a stem projecting through said bushing and terminating in a guide disc which lies in said valve guide-way, and a relief spring device secured in the aforesaid threaded opening at the outlet side of said valve casing and cooperating with said piston valve for the purposes described, said relief spring device comprising a cylinder secured to said valve casing, a relief spring in said cylinder, a spring adjusting screw, and a spring seat member, said piston valve having a cylindrical part and a neck extending into said cylinder, packing elements on said neck and jam nuts for said elements on said neck, said spring engaging said spring seat member and one of said packing nuts of the neck.

FRANK HENNEBÖHLE.